(12) United States Patent
Cui et al.

(10) Patent No.: US 8,848,549 B2
(45) Date of Patent: Sep. 30, 2014

(54) OPTIMIZING THROUGHPUT IN A WIRELESS COMMUNICATION SYSTEM

(75) Inventors: Tao Cui, Durham, NC (US); Feng Lu, Sunnyvale, CA (US); Anil Kumar Goteti, Evanston, IL (US); Vignesh Sethuraman, Santa Clara, CA (US); Subramanya P. Rao, Cupertino, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 12/552,206

(22) Filed: Sep. 1, 2009

(65) Prior Publication Data

US 2010/0067396 A1 Mar. 18, 2010

Related U.S. Application Data

(60) Provisional application No. 61/097,764, filed on Sep. 17, 2008, provisional application No. 61/097,752, filed on Sep. 17, 2008.

(51) Int. Cl.
*H04L 12/26* (2006.01)

(52) U.S. Cl.
USPC .......... 370/252; 370/329; 370/338; 370/328; 455/561; 455/425

(58) Field of Classification Search
CPC ..... H04L 12/26; H04L 5/0053; H04L 1/0026; H04L 1/1671; H04L 5/007; H04L 5/001
USPC .......... 370/252, 338, 329, 328; 455/561, 425, 455/452.1, 67.5, 69, 101; 375/260, 355
See application file for complete search history.

(56) References Cited

U.S. PATENT DOCUMENTS

| | | | |
|---|---|---|---|
| 7,907,558 B2 | 3/2011 | Shahid et al. | |
| 2001/0003830 A1* | 6/2001 | Nielsen | 709/226 |
| 2002/0061082 A1* | 5/2002 | Balakrishnan et al. | 375/355 |
| 2003/0148738 A1* | 8/2003 | Das et al. | 455/67.5 |
| 2005/0250540 A1* | 11/2005 | Ishii et al. | 455/561 |
| 2006/0023745 A1 | 2/2006 | Koo et al. | |
| 2007/0058735 A1* | 3/2007 | Ghosh | 375/260 |

(Continued)

FOREIGN PATENT DOCUMENTS

| EP | 1227603 A1 | 7/2002 |
|---|---|---|
| EP | 1463230 | 9/2004 |

(Continued)

OTHER PUBLICATIONS

International Search Report and Written Opinion—PCT/US2009/057321, International Search Authority—European Patent Office—Sep. 23, 2010.

(Continued)

*Primary Examiner* — Jamal Javaid
(74) *Attorney, Agent, or Firm* — Rupit M. Patel

(57) ABSTRACT

A method for optimizing throughput in a wireless communication system is disclosed. A target metric is estimated based on previous acknowledgment data. A channel quality indicator offset is determined based on the target metric. A channel quality indicator is adjusted based on the channel quality indicator offset. The channel quality indicator indicates the quality of a wireless transmission channel.

28 Claims, 12 Drawing Sheets

(56) References Cited

U.S. PATENT DOCUMENTS

2007/0097932 A1* 5/2007 Shahid et al. .............. 370/338
2009/0069042 A1* 3/2009 Wang et al. ................. 455/522
2009/0116402 A1* 5/2009 Yamasaki ................... 370/253

FOREIGN PATENT DOCUMENTS

| EP | 1513282 | A2 | 3/2005 |
| EP | 1592139 | A2 | 11/2005 |
| EP | 1655873 | | 5/2006 |
| WO | WO03047198 | | 6/2003 |
| WO | WO2005081419 | | 1/2005 |

OTHER PUBLICATIONS

Taiwan Search Report—TW098131376—TIPO—Mar. 13, 2013.

* cited by examiner

OPTIMIZING THROUGHPUT IN A WIRELESS COMMUNICATION SYSTEM

RELATED APPLICATIONS

This application is related to and claims priority from U.S. Provisional Patent Application Ser. No. 61/097,764 filed Sep. 17, 2008, for "Method and Apparatus for Scheduling in a Wireless Communications System," and from U.S. Provisional Patent Application Ser. No. 61/097,752 filed Sep. 17, 2008, for "Method and Apparatus for Throughput Optimization in a Wireless Communications System,".

TECHNICAL FIELD

The present disclosure relates generally to communication systems. More specifically, the present disclosure relates to optimizing throughput in a wireless communication system.

BACKGROUND

Wireless communication systems have become an important means by which many people worldwide have come to communicate. A wireless communication system may provide communication for a number of mobile devices, each of which may be serviced by a base station. Examples of mobile devices include cellular phones, personal digital assistants (PDAs), handheld devices, wireless modems, laptop computers, personal computers, etc.

As wireless communication becomes more popular, there are new challenges to accommodating large call volumes and maintaining call quality in a cost-efficient manner. One way to increase efficiency is to maximize the data rate of transmissions. Mobile devices communicate over a physical air channel. When the channel is high quality a base station may seek to send more data during a given time than with a low quality channel. Therefore, benefits may be realized by improved methods and apparatus for optimizing throughput in a wireless communication system.

DETAILED DESCRIPTION

Figure 1:
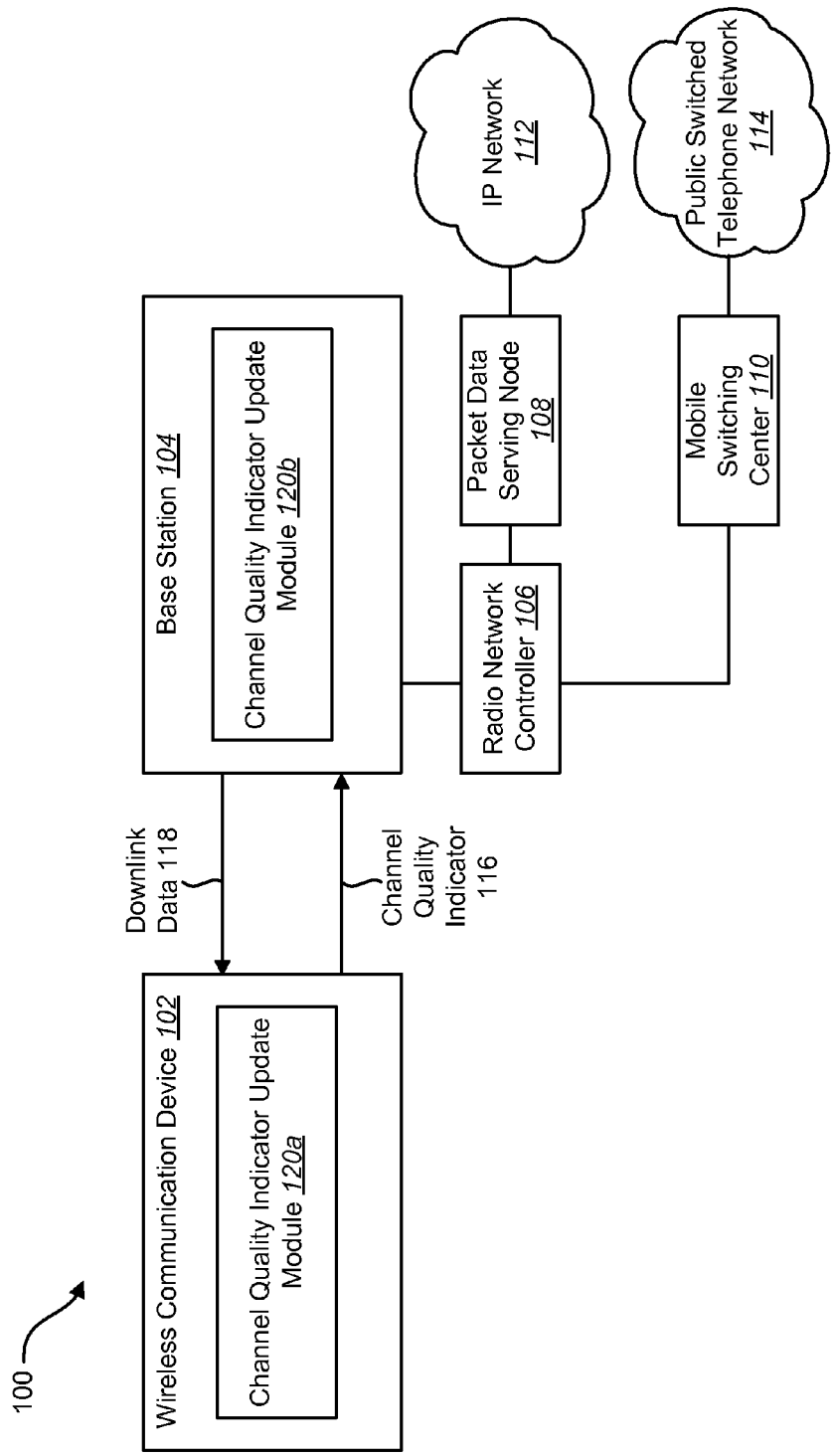
FIG. 1 is a block diagram of a wireless communication system with optimized throughput.

A method for optimizing throughput in a wireless communication system is disclosed. A target metric is estimated based on previous acknowledgment data. A channel quality indicator offset is determined based on the target metric. A channel quality indicator is adjusted based on the channel quality indicator offset. The channel quality indicator indicates the quality of a wireless transmission channel.

In one configuration, future transmissions may be scheduled in the wireless communication system based on the adjusted channel quality indicator. Furthermore, the wireless communication system may use High Speed Downlink Packet Access (HSDPA). The previous acknowledgment data may indicate previous acknowledgment and non-acknowledgment signaling between a wireless communication device and a base station in the wireless communication system.

The target metric may be the block error rate and the channel quality indicator offset may be determined based on the short term block error rate and a target block error rate. Alternatively, the target metric may be an average throughput for a wireless communication device over a predefined number of received subframes. The average throughput may be estimated further based on transmit block sizes over a predefined number of received subframes. The channel quality indicator offset may be determined further based on one or more previous channel quality indicator offsets.

An apparatus for optimizing throughput in a wireless communication system is also disclosed. The apparatus includes a processor and memory in electronic communication with the processor. Executable instructions are stored in the memory. The instructions are executable to estimate a target metric based on previous acknowledgment data. The instructions are also executable to determine a channel quality indicator offset based on the target metric. The instructions are also executable to adjust a channel quality indicator based on the channel quality indicator offset. The channel quality indicator indicates the quality of a wireless transmission channel.

An apparatus for optimizing throughput in a wireless communication system is also disclosed. The apparatus includes means for estimating a target metric based on previous acknowledgment data. The apparatus also includes means for determining a channel quality indicator offset based on the target metric. The apparatus also includes means for adjusting a channel quality indicator based on the channel quality indicator offset. The channel quality indicator indicates the quality of a wireless transmission channel.

A computer-program product for optimizing throughput in a wireless communication system is also disclosed. The computer-program product comprises a computer-readable medium having instructions thereon. The instructions include code for estimating a target metric based on previous acknowledgment data. The instructions also include code for determining a channel quality indicator offset based on the target metric. The instructions also include code for adjusting a channel quality indicator based on the channel quality indicator offset. The channel quality indicator indicates the quality of a wireless transmission channel.

The success of 3rd generation wireless cellular networks is mainly based on efficient provisioning of the expected wide variety of services requiring different Quality of Service with respect to data rate, delay and error rate. In order to improve support for high data rate packet switched services, $3^{rd}$ Generation Partnership Project (3GPP) has developed an evolution of Universal Mobile Telecommunications System (UMTS) based on Wideband Code Division Multiple Access (WCDMA) known as High Speed Downlink Packet Access (HSDPA) which was included in the Release 5 specifications as found in "3GPP, TR 25.858 version 5.0.0, Physical Layer Aspects of UTRA High Speed Downlink Packet Access," published Mar. 29, 2002 by 3GPP. HSDPA targets increased capacity, reduced round trip delay, and higher peak downlink (DL) data rates. Evolutions of HSDPA featuring data rates up to 84 Mbps are under development.

The present systems and methods may optimize throughput in a wireless communication system. The term "throughput," as referred to herein (e.g., in HSDPA), refers to the rate of transfer of information bits over a wireless channel in units of bits per subframe. For the sake of illustration, a brief explanation of throughput now follows. For a given resource allocation for a user, a wireless network may schedule different transport format resource combinations (TFRCs) to a user depending on the perceived channel conditions of the user. In other words, a base station may receive a channel quality indicator (CQI) that indicates the quality of a transmission channel, and the base station may tailor future transmissions and allocate various resources based on the CQI. The CQI may be an indication of the ability of a wireless communication device to reliably support information transfer. For example, a network scheduler may use a 30 entry table of CQI versus TFRC where a TFRC, (i.e., a combination of transmission parameters and options), is chosen as a function of a CQI. A reported CQI may be a particular metric, such as a signal to noise ratio (SNR), that is mapped to a value between 1 and 30. Other metrics that may be used to compute the CQI include a bit error rate (BER), frame error rate (FER), etc. The CQI, therefore, may be unitless. In some cases, a unit increase in the reported CQI may correspond to an increase of 1 dB in SNR at the wireless communication device. Alternatively, a unit increase in the reported CQI may correspond to an increase of 2 dB in SNR at the wireless communication device. Therefore, there is no fixed translation scale between the underlying metric and the CQI. In other words, the CQI may be computed in a unique manner for a wireless communication device.

For a given signal to noise ratio (SNR), g in dB, $p_{cqi}(g)$ denotes the probability that a new transmission with TFRC corresponding to a CQI index, cqi, is scheduled. Additionally, $b_{cqi}(g)$ denotes the first block error rate (BLER), (i.e., the block error rate corresponding to the first transmission), when the total block size (TBS) corresponding to cqi is scheduled. Lastly, $TBS_{cqi}$ denotes the transmit block size (TBS) corresponding to cqi. For the sake of illustration, assume that the second block error rate (retransmission second block error rate) is zero. Therefore, in the following description, "BLER" denotes first transmission second block error rate.

A Block error rate (BLER) is a metric that is computed from acknowledgments (ACKs) and non-acknowledgments (NACKs) over a period of communication. Block error rate is a key metric that affects the throughput of a wireless communication system. In general, a block error rate refers to the block error rate statistically averaged over sufficiently long periods of time and takes values between 0 and 1. The term "target block error rate" refers to a desired block error rate.

Assuming that N subframes are to be received by a wireless communication device, the average number of new transmissions with $TBS_{cqi}$ is $p_{cqi}(g)N$. The average number of subframes required to send $p_{cqi}(g)N$ subframes is $p_{cqi}(g)(1+b_{cqi}(g))N$, assuming the second BLER is zero. Therefore, the average throughput at SNR g is given according to Equation (1):

$$T(g) = \frac{\sum_{cqi=1}^{30} Pcqi(g)TBS_{cqi}}{\sum_{cqi=1}^{30} Pcqi(g)(1+b_{cqi}(g))} \quad (1)$$

The estimated CQI may be modeled as a random variable with mean $m(g)=g+\kappa$, where $\kappa$ is a fixed offset, and probability density function (pdf) of $f(cqi,m(g))$.

Given g, $p_{cqi}(g)$ may be computed according to Equation (2):

$$p_{cqi}(g) = \begin{cases} \int_{cqi-0.5}^{+\infty} f(x, m(g))dx, & \text{if } cqi = 30, \\ \int_{+\infty}^{cqi+0.5} f(x, m(g))dx, & \text{if } cqi = 1, \\ \int_{cqi-0.5}^{cqi+0.5} f(x, m(g))dx, & \text{otherwise.} \end{cases} \quad (2)$$

When a CQI offset $\Delta$ is applied on $\kappa$ or the distribution is shifted by $\Delta$, Equation (3) is modified according to Equation (3):

$$Pcqi(\Delta) = \int_{cqi-0.5}^{cqi+0.5} f(x-\Delta, m(g))dx = \int_{cqi-0.5-\Delta}^{cqi+0.5-\Delta} f(x, m(g))dx \quad (3)$$

for cqi≠1,30 and T(g) in Equation (1) will also be a function of $\Delta$, i.e., $T(\Delta)$. In the following description, for clarity in writing expressions such as $T(\Delta)$, the dependence on g may be omitted, e.g., $T(g,\Delta)$ may be written as $T(\Delta)$. In fading channels, the average throughput $T(\Delta)$ may be an average of Equation (1) over all fading states and may depend on the average SNR. One possible CQI adjustment mechanism in commercial networks may be the application of a CQI offset, $\Delta$. The present systems and methods, therefore, seek to maximize the average throughput over $\Delta$, as shown in Equation (4):

$$\max_{\Delta} T(\Delta) \quad (4)$$

FIG. 1 is a block diagram of a wireless communication system 100 with optimized throughput. The system 100 may include a wireless communication device 102 that communicates with a base station 104. Examples of a wireless communication device 102 include cellular phones, personal digital assistants (PDAs), handheld devices, wireless modems, laptop computers, personal computers, etc. A wireless communication device 102 may alternatively be referred to as an access terminal, a mobile terminal, a mobile station, a remote station, a user terminal, a terminal, a subscriber unit, a mobile device, a wireless device, a subscriber station, user equipment, or some other similar terminology. The base station 104 may alternatively be referred to as an access point, a Node B, an evolved Node B, or some other similar terminology.

The base station 104 may communicate with a radio network controller 106 (also referred to as a base station controller or packet control function). The radio network controller 106 may communicate with a mobile switching center (MSC) 110, a packet data serving node (PDSN) 108 or internetworking function (IWF), a public switched telephone network (PSTN) 114 (typically a telephone company), and an Internet Protocol (IP) network 112 (typically the Internet). The mobile switching center 110 may be responsible for managing the communication between the wireless communication device 102 and the public switched telephone network 114 while the packet data serving node 108 may be responsible for routing packets between the wireless communication device 102 and the IP network 112.

In one configuration, the wireless communication system 100 operates using High Speed Downlink Packet Access (HSDPA). In HSDPA, the wireless communication device 102 may monitor the quality of the downlink wireless channel and periodically report this information to the base station 104 on the uplink. This feedback, called Channel Quality Indicator (CQI) 116, may be an indication of the highest data rate that the wireless communication device 102 can reliably receive in the existing conditions on the downlink wireless channel. The frequency of reporting the CQI 116 is configured by the network, and is typically set to once every few milliseconds. Using the channel quality reports, the base station 104 may accordingly schedule downlink data 118 on the High Speed Physical Downlink Shared Channel (HSPDSCH). When sending downlink data 118, the base station 104 may specify various parameters, e.g., the transport block size (TBS) that is the number of information bits per packet, the number of channelization codes, as well as modulation and resource allocation choices such as HS-PDSCH transmit power allocation. The selection of these parameters may be guided by the base station's 104 interpretation of the reported CQI 116.

The CQI reports 116 are intended to accurately reflect the HSPDSCH performance that the wireless communication device 102 can support in the existing wireless channel conditions. In some configurations with static channel conditions, the wireless communication device 102 reports the CQI 116 such that the block error rate (BLER) at the median CQI 116 is close to 10%. The block error rate may be an indication of the rate at which downlink data 118 from the base station 104 is successfully received by the wireless communication device 102. In practice, the accuracy of CQI reports 116 in reflecting HSPDSCH performance may be influenced by the wireless channel conditions such as the speed of the mobile user and the dispersive nature of the channel. Therefore, achieving a certain target block error rate at a given scheduled data rate requires different average HSDSCH signal to noise ratios (SNR) under different channel conditions. Also, the base station 104 may use different transport block sizes, number of codes and modulation, collectively referred to as the transport format resource combination (TFRC), to achieve similar data rates. The exact choice of TFRC that the base station 104 uses may affect the required HSPDSCH signal to noise ratio (SNR) to achieve a certain target block error rate. These variabilities may cause the actual block error rate to deviate from the 10% target. Moreover, the 10% target block error rate may not yield maximum throughput under all conditions of the wireless channel.

Throughput optimization in HSDPA may be considered a two part problem. First, the system 100 should determine code and power allocation across users. Second, the system 100 should maximize the link throughput for each user for a given resource allocation. The present systems and methods focus on link throughput optimization using simple adjustments to the reported CQI 116.

The wireless communication device 102 may include a CQI update module 120a and the base station 104 may include a CQI update module 120b. The CQI update modules 120 may adjust the CQI 116 to maximize throughput in the system 100. Specifically, the CQI update modules 120 may use an offline or online algorithm for adjusting the CQI 116. In the offline algorithm, an adaptive algorithm may be used to achieve a given target block error rate using the stochastic gradient descent method, which adjusts a CQI offset adaptively based on the short term block error rate obtained from an acknowledgment/non-acknowledgment (ACK/NACK) history stored in either the wireless communication device 102 or the base station 104. In each subframe, a status report may be sent or not sent. If a status report is sent, it is either an ACK (short for acknowledge) or a NACK (short for negative ACK). If a status report is not sent, it is denoted by a NTX (noncontinuous transmission) or as DTX (discontinuous transmission). By searching through different target block error rates a throughput optimal block error rate may be found offline. The offline algorithm may be implemented at the wireless communication device 102 as well as at the base station 104. When applied at the base station 104, in addition to achieving the target block error rate, it may also save transmit power. The offline algorithm may be used not only to refine the CQI-BLER alignment but also to enable fair resource allocation among mobile users in HSDPA. Standard stochastic approximation (SA) algorithms typically require a decreasing stepsize, however, the offline algorithm may operate with a constant stepsize.

In the online algorithm, the CQI update modules 120 may use a variation of the Kiefer-Wolfowitz algorithm in stochastic approximation, which may not need to specify a target block error rate. The CQI offset may be adapted gradually using an estimated short term throughput gradient. The stepsize in the online algorithm may not decrease to zero. In addition, an adaptive stepsize mechanism may track temporal variation of the environment. With a constant stepsize, the online algorithm may converge to a small neighborhood of the local optimal solution. The offline algorithm may achieve the given target block error rate with high accuracy. Both throughput optimization algorithms may improve the throughput by up to 30%.

A throughput optimal block error rate may be calculated for popular channel path profiles. In general, the throughput optimal block error rate may not be 10% and may depend on the channel path profile. For additive white Gaussian noise (AWGN) channels, it is about 10%. The present systems and methods may be indicative of potential HSDPA throughput enhancement realizable in practice.

Figure 2:
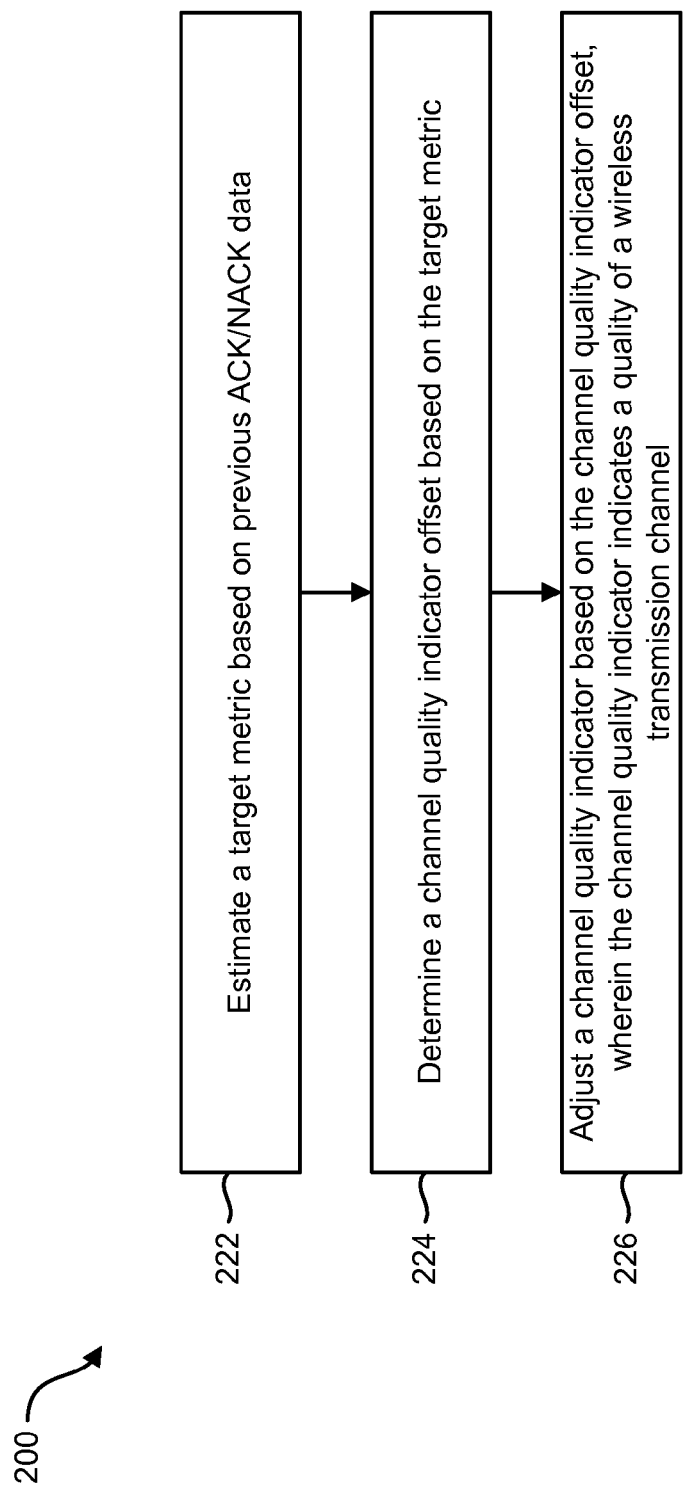
FIG. 2 is a flow diagram illustrating a method for optimizing throughput in a wireless communication system.

FIG. 2 is a flow diagram illustrating a method 200 for optimizing throughput in a wireless communication system 100. The method 200 may be performed by a wireless communication device 102, a base station 104, or both. The method 200 may include estimating 222 a target metric based on previous acknowledgment data. The method 200 may also include determining 224 a channel quality indicator 116 offset based on the target metric. The method 200 may also include adjusting 226 a channel quality indicator 116 based on the channel quality indicator 116 offset, where the channel quality indicator 116 indicates the quality of a wireless transmission channel.

In one configuration, the method 200 may be performed in a system using High Speed Downlink Packet Access (HSDPA). Furthermore, the method 200 may use an offline algorithm or an online algorithm for adjusting the Channel Quality Indicator (CQI) 116 used by the network to schedule data transmission. In the offline algorithm, a wireless communication device 102 or base station 104 may sweep through different target block error rates to find the throughput optimal block error rate offline. In this way, a given target BLER may be achieved by adjusting 226 a CQI 116 based on acknowledgment/non-acknowledgment (ACK/NAK) history. This algorithm could be used not only to optimize throughput but also to enable fair resource allocation among mobile users in HSDPA. In the online algorithm, the CQI offset is adapted using an estimated short term throughput gradient without specifying a target BLER. An adaptive step-size mechanism is proposed to track temporal variation of the environment. We investigate convergence behavior of both algorithms. Simulation results show that the proposed offline algorithm can achieve the given target block error rate with good accuracy. Both algorithms yield up to 30% HSDPA throughput improvement over that with 10% target BLER.

Figure 3:
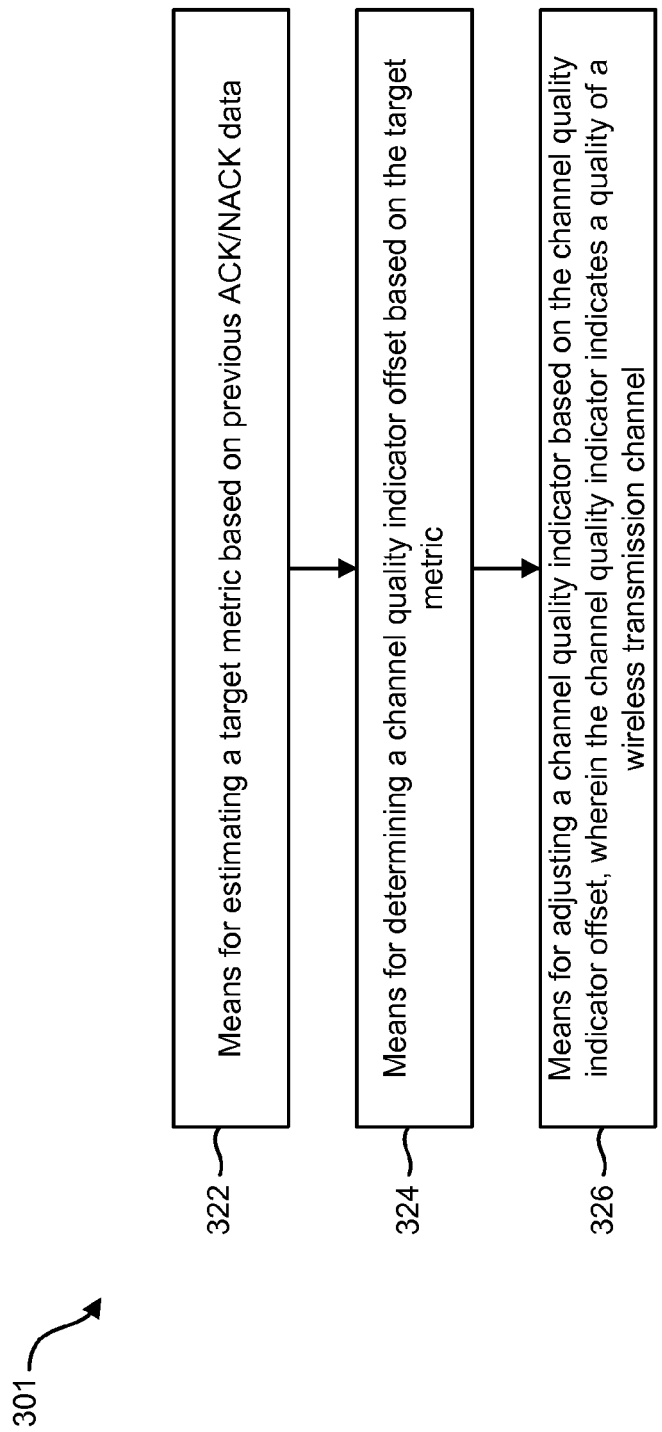
FIG. 3 illustrates means-plus-function blocks corresponding to the method of FIG. 2.

The method 200 of FIG. 2 described above may be performed by various hardware and/or software component(s) and/or module(s) corresponding to the means-plus-function blocks 301 illustrated in FIG. 3. In other words, blocks 222 through 226 illustrated in FIG. 2 correspond to means-plus-function blocks 322 through 326 illustrated in FIG. 3.

Figure 4:
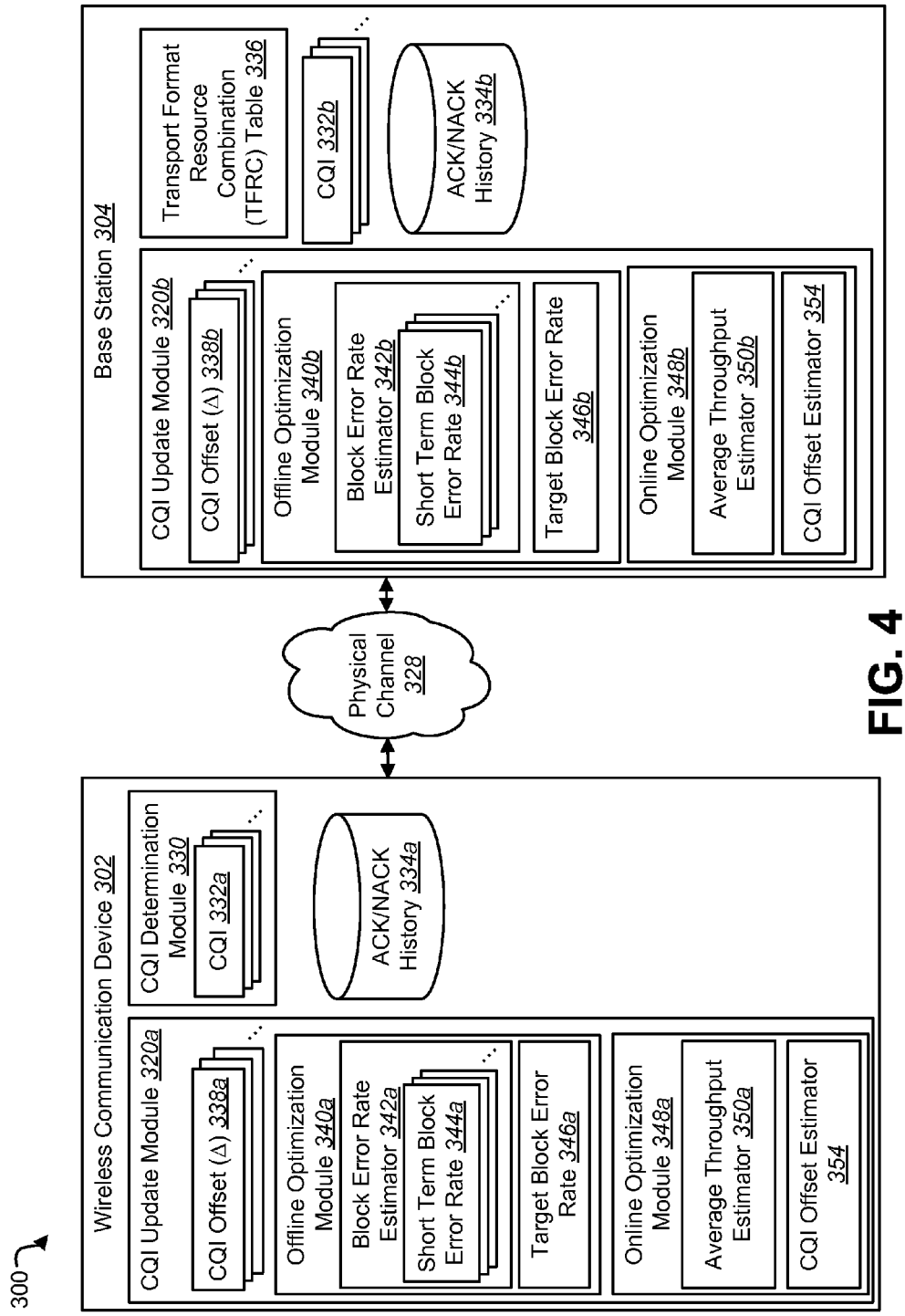
FIG. 4 is another block diagram of a wireless communication system with optimized throughput.

FIG. 4 is another block diagram of a wireless communication system 300 with optimized throughput. The system 300 may have a wireless communication device 302 that communicates with a base station 304 over a physical channel 328. The wireless communication device 302 may include a CQI determination module 330 that determines a CQI 332a. The CQI 332a may be an indication of the quality of one or more transmission channels between the wireless communication device 302 and the base station 304, i.e., an indication of the highest data rate that the wireless communication device 302 can reliably receive in the existing condition of the wireless channel. The wireless communication device 302 may include previous acknowledgment/non-acknowledgment (ACK/NACK) data 334a that indicates previous acknowledgment or non-acknowledgment signaling between the wireless communication device 302 and the base station 304. The ACK/NACK history 334a may be used by a CQI update module 320a to determine a CQI offset 338a that may be used to optimize throughput in the system 300.

The base station 304 may receive the CQI 332a from the wireless communication device 302 and store a copy. The base station 304 may use the CQI 332b to allocate downlink resources, e.g., transmit block size (TBS), modulation scheme, etc. To schedule future transmissions, the base station 304 may utilize a transport format resource combination (TFRC) table 336 that allows the base station 304 to tailor future transmissions and allocate various resources based on the CQI 332b, i.e., choose a transport block size (TBS), a modulation scheme, power adjustment, etc. The base station 304 may also include ACK/NACK history 334b that may be used by a CQI update module 320b when determining a CQI offset 338b. In other words, the following offline and online throughput optimization techniques may be performed by the wireless communication device 302, the base station 304, or both. Additionally, the CQI 332 may be adjusted based on other general metrics, such as a short term throughput.

In one configuration, an offline optimization module 340a on a wireless communication device 302 or an offline optimization module 340b on a base station 304 may use an offline technique to determine a CQI offset 338 using a target block error rate 346. As used herein, the term "offline" refers to an algorithm, process, or method that utilizes values for the target block error rate 346 that are pre-computed using past data or archived data. The choice of the target block error rate 346 may be performed by either the wireless communication device 302 or the base station 304. This choice may be communicated from the wireless communication device 302 to the base station 304, or may be communicated from the base station 304 to the wireless communication device 302. For example, the base station 304 may use a pre-computed, stored lookup table that maps channel conditions and resource constraints to a target block error rate 346, and use this target block error rate 346 to compute the CQI offset 338. This lookup table may be designed in an offline manner using archived data from previous communications. If the offline algorithm is performed on the wireless communication device 302, the target block error rate 346 may be chosen from a pre-computed lookup table and/or received from the base station 304. In contrast, the term "online" refers to an algorithm, process, or method that adaptively monitors and/or adjusts the CQI offset 338 without utilizing values for a target block error rate 346. While they are discussed in greater detail below, the offline and online optimization techniques will now be briefly described.

In the offline algorithm, a target block error rate (BLER) 346a-b may be identified. The target block error rate 346 may depend on multiple factors, such as path profile, mobility, interference level, resource constraints, etc. The target block error rate 346 may be defined by the CQI update module 320 or received by the CQI update module 320. Assume, for the purpose of illustration, that the system 300 is capable of operating at any target block error rate 346. In other words, the system 300 is capable of operating according to a target block error rate of 0, 0.1, 0.2, . . . , 0.9, or 1.0. Thus, at the end of the communication, an actual block error rate may be computed that coincides with the chosen target block error rate. Each possible target block error rate may produce a certain throughput in the system 300. Therefore, the throughput of the system 300 may be associated with corresponding values of target block error rates. The system 300 may then look at the throughput of the system 300 as a function of target block error rate, and identify a single target block error rate that gives the best throughput. This throughput optimal target block error rate will be referred to as the target block error rate 346.

A short term block error rate 344a-b may then be estimated by a block error rate estimator 342a-b. The short term block error rate 344 may be a statistic computed over a small time interval that gives an estimate of the long term average block error rate, i.e., the short term block error rate 344 is an estimate of the actual block error rate. Since the short term block error rate 344 is estimated over a small interval of time, it may not always be equal to the actual block error rate and may be prone to estimation error, however it is generally an adequate estimation. The short term block error rate 344 is an operational variable that is continuously changing in the course of communication. In contrast, the target block error rate 346 is a control parameter that is typically unchanged over long periods of communication.

The short term block error rate 344, $\hat{b}$, may be estimated over a window of W transmissions, e.g., $$\hat{b} = \frac{numNACK}{W}$$

where numNACK is the number of non-acknowledgment signals during the W transmissions. The CQI offset 338, $\Delta$, may then be updated based on the short term block error rate 344 and the target block error rate 346, b*, e.g., $\Delta_{n+1} = \Delta_n - \alpha (\hat{b}_{n+1} - b^*)$ where $\alpha$ is a positive step size value. Therefore, when the short term block error rate 344 is higher than target block error rate 346, the CQI offset 338 may be decremented, i.e., future transmissions from the base station 304 may have a slightly smaller transmit block size. After some time, the short term block error rate 344 may also decrease, thus moving closer to the target block error rate 346.

In another configuration, an online optimization module 348a-b on either the wireless communication device 302 or the base station 304 may use an online technique to determine a CQI offset 338. The online technique may not use a target block error rate 346 and thus may not require offline calculations. The CQI offset 338 may be given by a gradient descent method, e.g., $$\Delta_{n+1} = \Delta_n + \alpha' \frac{dT(\Delta_n)}{d\Delta}.$$

In other words, an average throughput estimator 350a-b may estimate the throughput once with the current CQI offset 338. The throughput may then be estimated with a slightly different CQI offset 338: $\alpha+\epsilon$, where $\epsilon$ is initially set to a small value. Thus, the difference between the estimated throughput using $\Delta$, $T(\Delta)$, versus using $(\Delta+\epsilon)$, $T(\Delta+\epsilon)$, may be used by the CQI offset estimator 354 to estimate the throughput gradient and determine a new CQI offset 338, i.e., $$\Delta_{n+1} = \Delta_n - \frac{\alpha}{T(\Delta_n)} \frac{T(\Delta_n + \varepsilon) - T(\Delta_n)}{\varepsilon}.$$

The parameters $\alpha$ and $\epsilon$ may further be updated using gradient descent methods. This may be useful in time varying channels.

The present systems and methods may achieve throughput optimization in HSDPA using two adaptive outer loop algorithms. Both algorithms adjust the CQI offset 338 to maximize the throughput. The offline algorithm uses an adaptive algorithm to achieve a given target block error rate 344 using the stochastic gradient descent method based on the ACK/NACK history 334. By searching through different target block error rates 346, the throughput optimal block error rate 346 can be found offline. The online algorithm uses a variation of the Kiefer-Wolfowitz algorithm without specifying a target block error rate 346. An adaptive stepsize mechanism may also be used to make the algorithm robust to non-stationary condition. Both algorithms converge with a constant stepsize. Furthermore, the present systems and methods may achieve up to 30% throughput improvement over that with 10% target block error rate 346.

Figure 5:
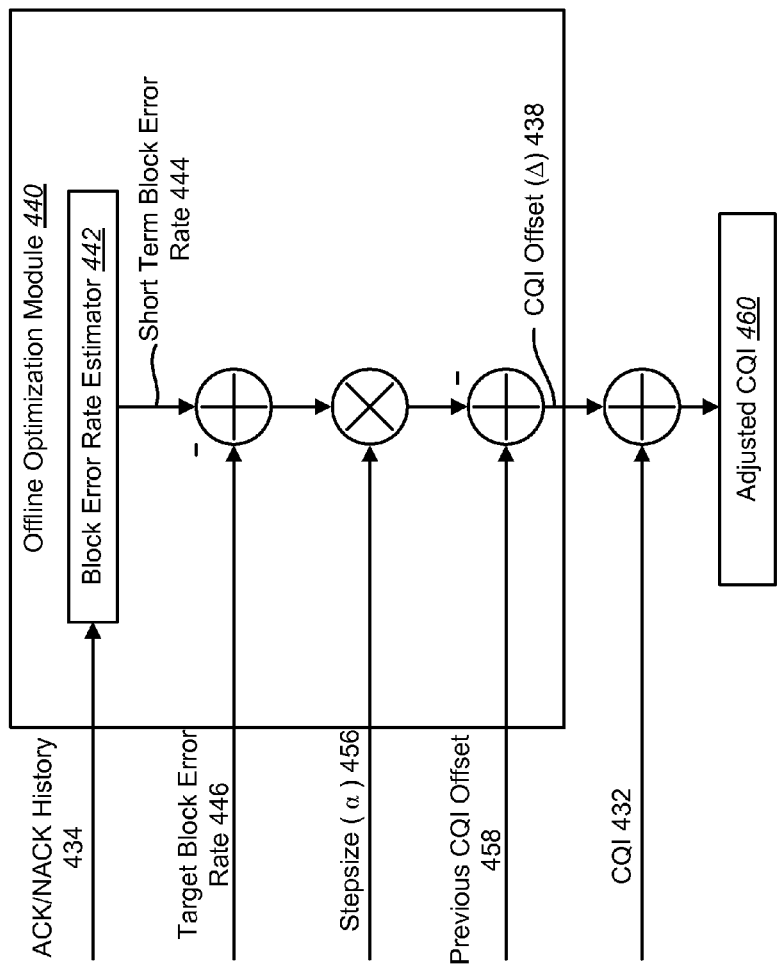
FIG. 5 is a block diagram of an offline optimization module.

FIG. 5 is a block diagram of an offline optimization module 440. The module 440 may be in a wireless communication device 302, a base station 304, or both. The offline algorithm may compare the current short term block error rate 444 with the target block error rate 446 and update the CQI offset 438 according to Equation (5):

$$\Delta_{n+1} = [\Delta_n - \alpha(\hat{b}_n(\Delta_n) - b^*)]^U \quad (5)$$

where $\Delta_n$ is the CQI offset 438 at the n-th iteration (i.e., the previous CQI offset 458), $\hat{b}_n(\Delta_n)$ is the short term block error rate 444 at the n-th iteration, $\alpha$ is a positive stepsize 456, and $[\bullet]U$ denotes the mapping onto set U to limit the range of CQI offset 438. For example, U may be chosen as $U=[-2,2]$ to limit the CQI offset 438 between −2 and 2. Though the mapping $[\bullet]U$ may not be necessary to achieve convergence, it may be used avoid an undesired large CQI offset 438.

The short term average block error rate 444, $\hat{b}(\Delta)$, may be estimated using the ACK/NACK history 434 within a sliding window of size w. Let $t_n$ be the starting time of the n-th window for CQI offset update with $t_1=1$. Furthermore, $X(t)$ and $Y(t)$ denote the status of the first transmission ACK and NACK in subframe t, respectively, where $X(t)=1$ if a first transmission ACK is received and $X(t)=0$ otherwise, and $Y(t)=1$ if a first transmission NACK is received and $Y(t)=0$ otherwise. The times $t_n$, $t_n+1$ may be chosen such that the number of first time transmissions between $t_n+1$ and $t_{n+1}$ is w, i.e.

$$\sum_{t=t_n+1}^{t_{n+1}} (X(t) + Y(t)) = w.$$

The short term first time block error rate 444 may then be estimated by a block error rate estimator 442 according to Equation (6):

$$\hat{b}_n(\Delta_n) = \frac{\sum_{t=t_n+1}^{t_{n+1}} Y(t)}{w} \quad (6)$$

Since the status of ACK/NACK is available at both the base station 304 and the wireless communication device 302, the offline CQI update algorithm may be implemented at both sides. At the wireless communication device 302, since the unquantized (or raw) CQI 432 is available, $\Delta_n$ may be added to the raw CQI 432, $CQI_{raw}$, directly, i.e., the reported CQI 432 is the quantization of $\Delta_n+CQI_{raw}$. However, in high geometry, $CQI_{raw}$ may be greater than 30. Because the maximum value for a reported CQI 432 is 30, the wireless communication device 302 should report 30 even though the current channel condition may be capable of supporting a data rate (TBS) higher than that corresponding to a reported CQI 432 of 30. In this case, the target first block error rate 446 may not be achieved for any applied CQI offset 438 because $b_{cqi}(g)<b^*$, $\forall cqi \in \{1, \ldots, 30\}$ and $b(\Delta)$ is less than b* for all $\Delta$. This problem may be resolved by using the base station 304 algorithm.

At the base station 304, only reported quantized CQI 432 from the wireless communication device 302 may be available. After obtaining CQI offset 438, $\Delta_n$, it performs quantization $Q(\Delta_n+CQI_{reported})$ (not shown) and transmits a transmit block size (TBS) corresponding to the CQI 432 after quantization, where $CQI_{reported}$ is the reported CQI 432 from the wireless communication device 302 and $Q(\bullet)$ is the CQI quantization function that maps its input to an integer between 1 and 30. To get a fine control of the block error rate and throughput and achieve the target block error rate 446 even at high SNR, the power of the high speed physical downlink shared channel (HS-PDSCH) channel may be changed by using the residual CQI, i.e., the high speed physical downlink shared channel (HS-PDSCH) channel power may be reduced by $(\Delta+CQI_{reported})-Q(\Delta+CQI_{reported})$. By applying this method at the base station 304, when $(\Delta+CQI_{reported})>30$, the high speed physical downlink shared channel (HS-PDSCH) power may be reduced such that there exists a cqi such that $b_{cqi}(g)>b^*$. Thus, the target block error rate 446 may still be achieved when the adjusted CQI 460 is used for future scheduling. This may also save power at the base station 304. From the system 300 point of view, this means that base station 304 may support more users and the overall system's performance may be improved.

This offline algorithm may be used to enable fair resource allocation among wireless communication devices 302 by assigning a fixed target block error rate 446 for each wireless communication device 302. In this case, even though a wireless communication device 302 may report a higher CQI 432, the proposed algorithm may add a negative CQI offset 438 to the reported CQI 432 such that the scheduled transmit block size (TBS) achieves the target block error rate 446. Thus, the base station 304 may actually monitor whether the reported CQI 432 from each wireless communication device 302 matches the current channel condition the wireless communication devices 302 suffers.

Figure 6:
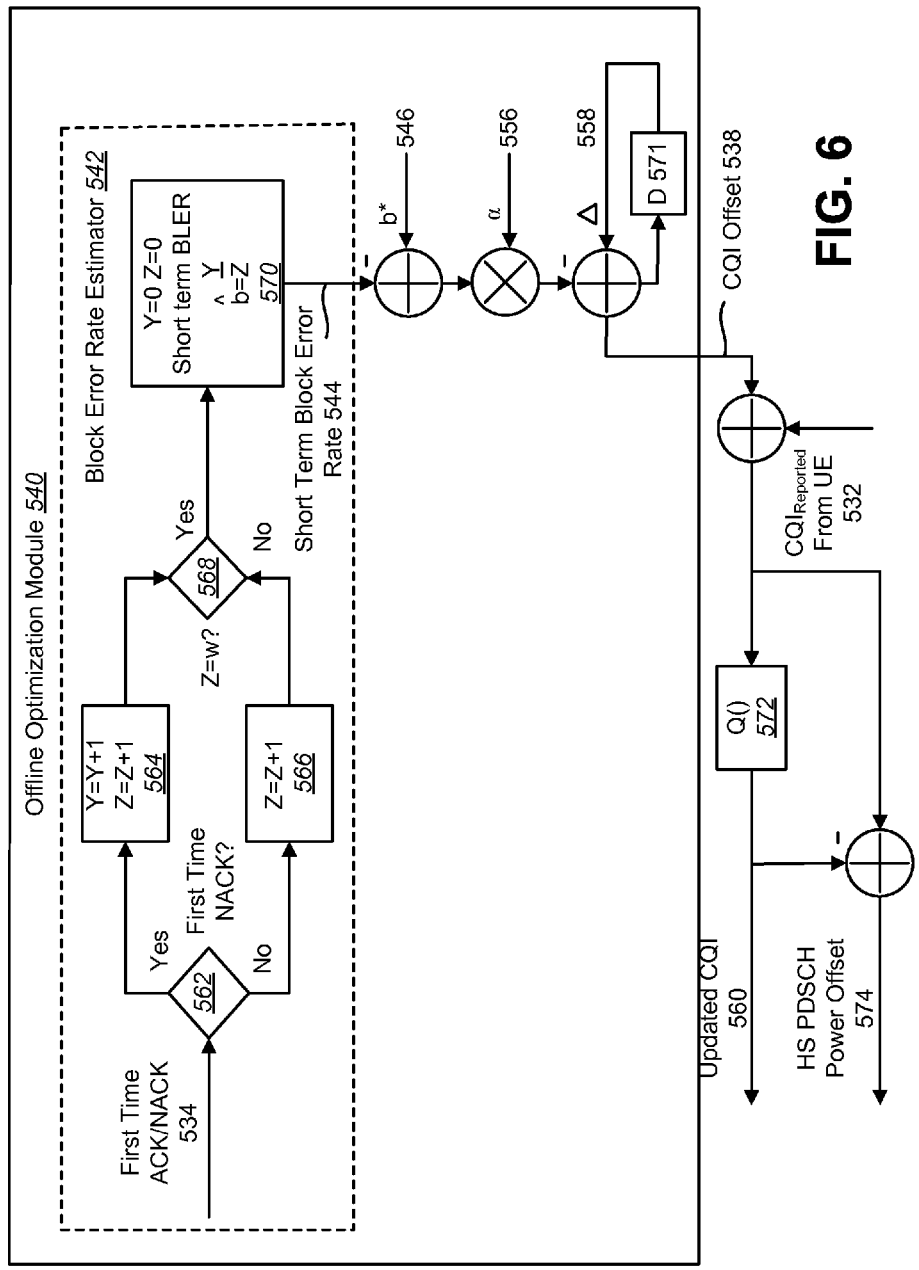
FIG. 6 is another block diagram of an offline optimization module.

FIG. 6 is another block diagram of an offline optimization module 540. The offline optimization module 540 may include a block error rate estimator 542 that receives ACK/NACK history 534 as input and outputs a short term block error rate 544. Specifically, the block error rate estimator 542 may first determine 562 if a message in the ACK/NACK data 534 is a NACK message. If yes, then a NACK counter, Y, and a window counter, Z, may be incremented 564. If no, then only the window counter, Z, may be incremented 566. Then, if the block error rate estimator 542 determines 568 that the window counter has reached a predetermined threshold, (i.e., Z=w), then the window counter and the NACK counter may be reset and a short term block error rate 544 may be calculated 570. Specifically, the short term block error rate 544 may be calculated 570 as $$\hat{b} = \frac{Y}{Z}.$$

Then, according to Equation (5), various other parameters may be introduced, i.e., a target block error rate 546 (b*), a stepsize 556 ($\alpha$), and the previous CQI offset 558 ($\Delta_n$). A delay element 571, D, may save a raw CQI offset at its input at time index n, and push this value out as its output at time index n+1. In other words, at time index n+1, the output is $\Delta_n$. This $\Delta_n$ minus (b($\Delta$)−b*) equals $\Delta_{n+1}$, and the cycle repeats itself. This may produce a CQI offset 538 ($\Delta_{n+1}$) that may be summed with the reported CQI 532 and quantized 572 to produce an updated CQI 560. A high speed physical downlink shared channel (HS-PDSCH) channel power offset 574 may also be computed by ($\Delta$+CQI$_{reported}$)−Q($\Delta$+CQI$_{reported}$).

Figure 7:
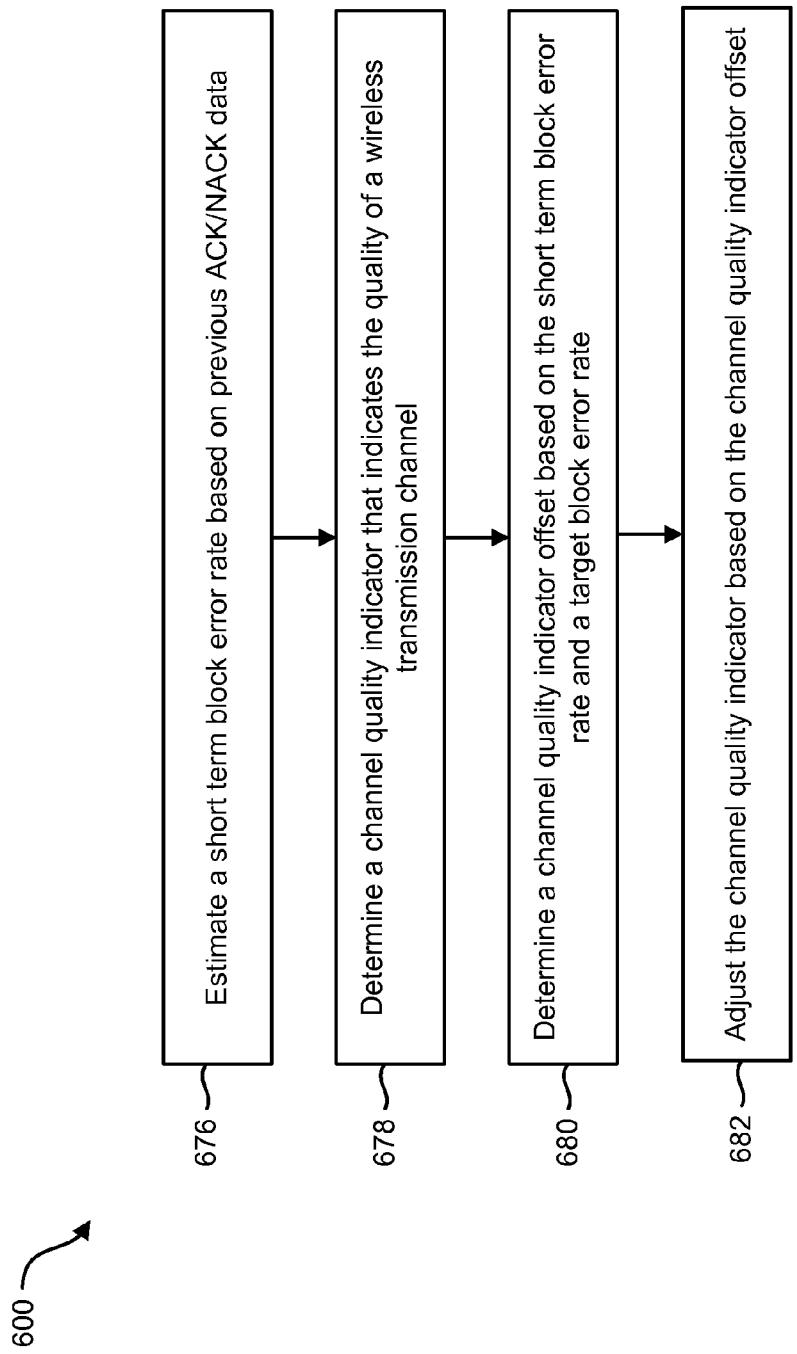
FIG. 7 is a flow diagram of a method for optimizing throughput in a wireless communication system.

FIG. 7 is a flow diagram of a method 600 for optimizing throughput in a wireless communication system 300. The method 600 may use offline optimization techniques and may be performed by an offline optimization module 440. The offline optimization module 440 may estimate 676 a short term block error rate 444 based on previous ACK/NACK history 434. The offline optimization module 440 may also determine 678 a CQI 632 that indicates the quality of a wireless transmission channel. The offline optimization module 440 may also determine 680 a CQI offset 438 based on the short term block error rate 444 and a target block error rate 446. The offline optimization module 440 may also adjust 682 the CQI 432 based on the CQI offset 438. The adjusted CQI 460 may then be used to tailor future transmissions from a base station 304 to a wireless communication device 302.

Figure 8:
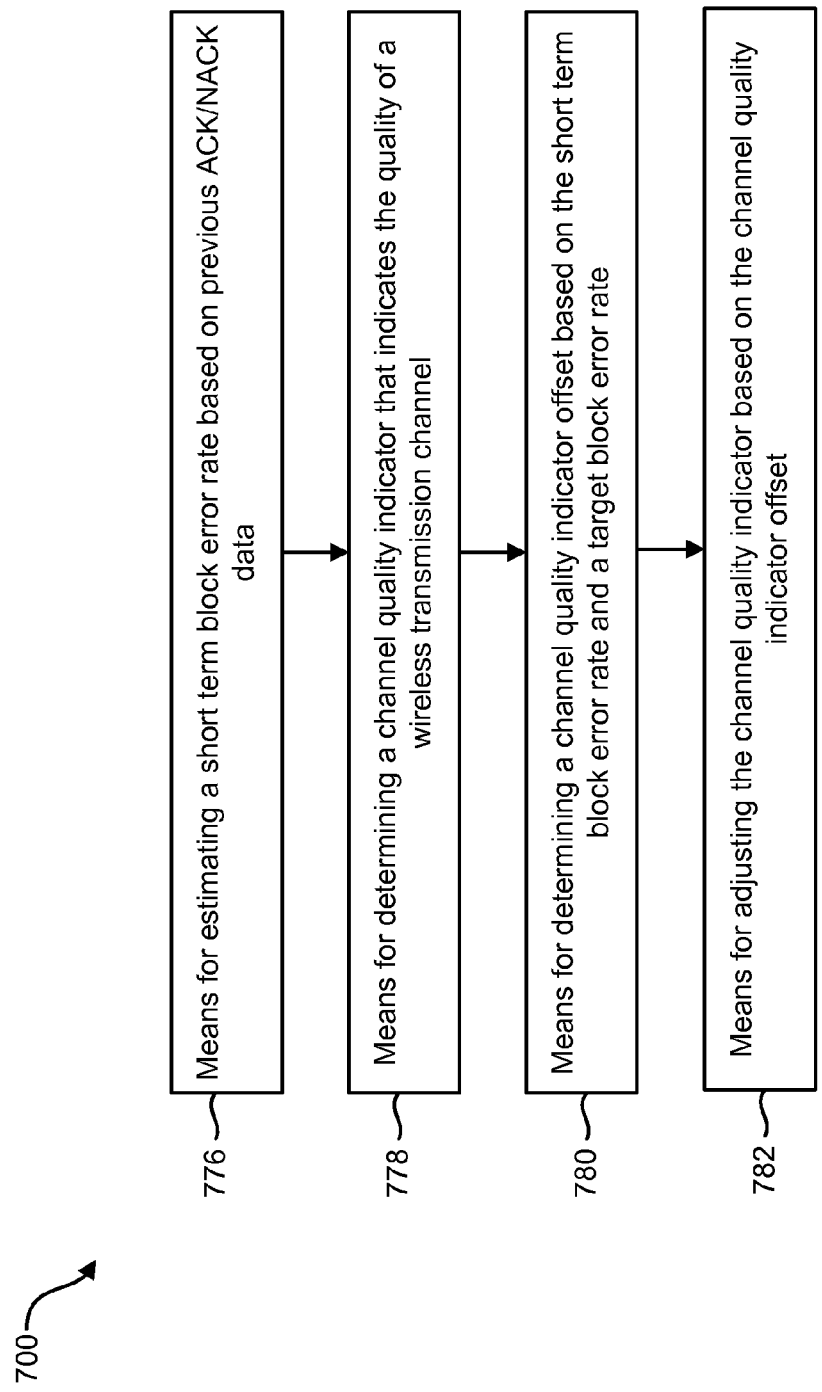
FIG. 8 illustrates means-plus-function blocks corresponding to the method of FIG. 7.

The method 600 of FIG. 7 described above may be performed by various hardware and/or software component(s) and/or module(s) corresponding to the means-plus-function blocks 700 illustrated in FIG. 8. In other words, blocks 676 through 682 illustrated in FIG. 7 correspond to means-plus-function blocks 776 through 782 illustrated in FIG. 8.

Figure 9:
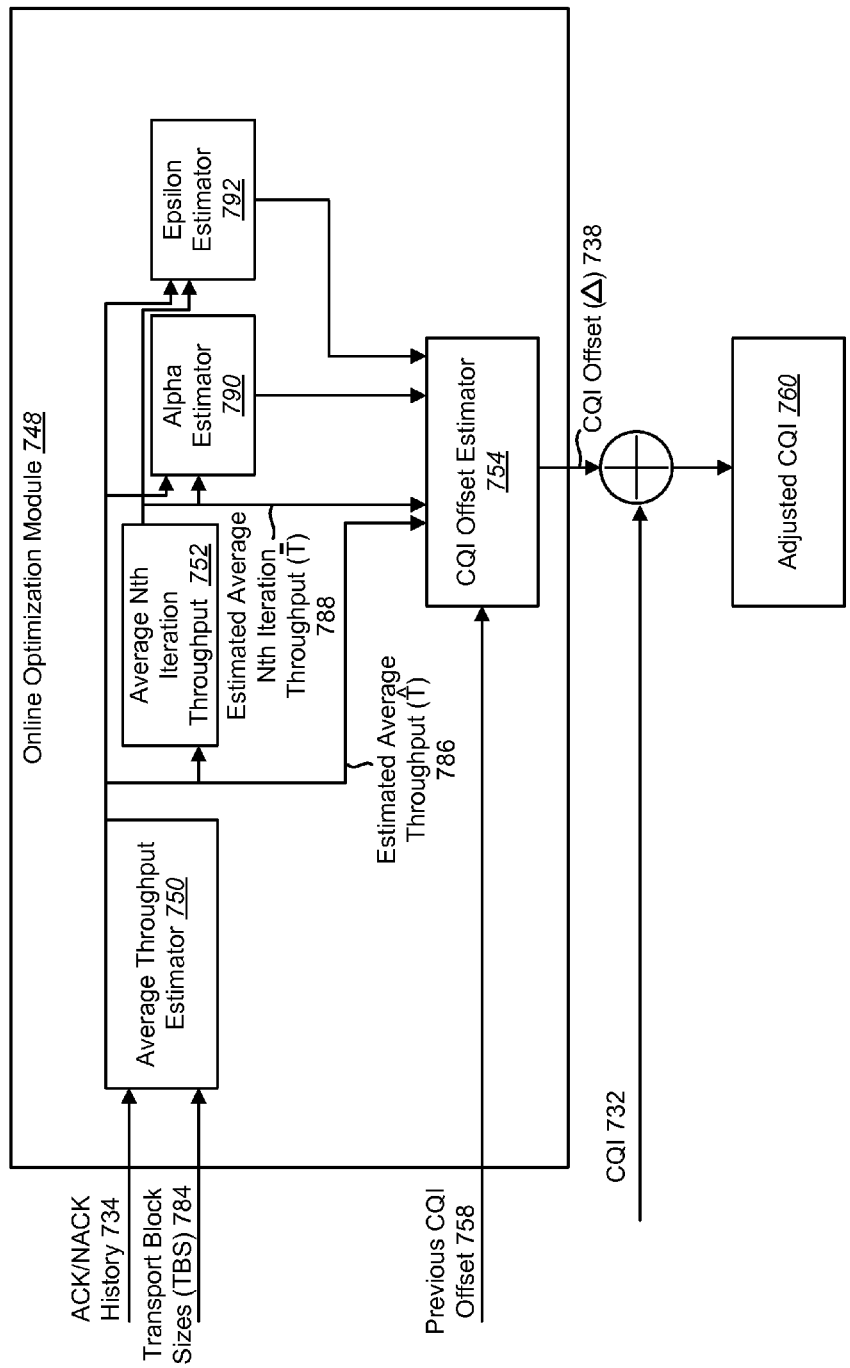
FIG. 9 is a block diagram of an online optimization module.

FIG. 9 is a block diagram of an online optimization module 748. The online optimization module 748 may use an online throughput optimization algorithm, which may not need to specify a target block error rate 446. The online algorithm may work for any CQI table and any SNR.

To maximize the average throughput T($\Delta$), the gradient descent method may be used to find the maximum throughput and its corresponding CQI offset 738. Assume that g is fixed until the algorithm converges. Let $\Delta_n$ be the CQI offset 758 at the n-th iteration and $$\frac{dT(\Delta)}{d\Delta}$$

be the derivative of T($\Delta$) with respect to $\Delta$. By using gradient descent method, the CQI offset 738 update is given by Equation (7):

$$\Delta_{n+1} = \Delta_n + \alpha' \frac{dT(\Delta_n)}{d\Delta} \quad (7)$$

where $\alpha'>0$ is a stepsize. However, Equation (7) may directly require knowledge of both the exact derivative and the average throughput function. Therefore, Equation (7) may be replaced with Equation (8):

$$\Delta_{n+1} = \Delta_n + \alpha' \frac{\hat{T}(\Delta_n + \varepsilon) - \hat{T}(\Delta_n)}{\varepsilon} \quad (8)$$

where $\hat{T}(\Delta_n)$ is an estimated average throughput 786, i.e., an estimate of T($\Delta_n$). Like the offline algorithm, a window based algorithm may be used by the average throughput estimator 750 to calculate the estimated average throughput 786. Let TBS(t) be the transmit block size (TBS) 784 transmitted in subframe t and R(t) and F(t) denote the status of the ACK/NACK 734. Specifically, let R(t)=1 if an ACK is received and R(t)=0 otherwise, and F(t)=1 if an ACK or NACK is received and F(t)=0 otherwise. Suppose that the CQI offset $\Delta$ 738 is updated every w subframes and the average throughput T($\Delta_n$) is computed using the past w received subframes. At the beginning of the n-th iteration, T($\Delta_n$) may be computed via Equation (9):

$$\hat{T}(\Delta_n) = \frac{\sum_{t=(n-1)w+1}^{nw} R(t)TBS(t)}{\sum_{t=(n-1)w+1}^{nw} F(t)} \quad (9)$$

The choice of $\alpha'$ may affect the performance of the offline algorithm. One possible value is where $$\alpha' = \frac{\alpha}{\bar{T}_n},$$

$\bar{T}_n$ 788 is the average throughput up to the n-th iteration, i.e., $$\bar{T}_n = \frac{\sum_{i=1}^{n} \hat{T}(\Delta_i)}{n}.$$

An average Nth iteration throughput estimator 752 may receive an estimated average throughput 786, ($\hat{T}$), and produce an estimated average Nth iteration throughput 788, (T). Then, Equation (8) becomes Equation (10):

$$\Delta_{n+1} = \left[\Delta_n + \left[\frac{\alpha}{T_n} \frac{\hat{T}(\Delta_n + \varepsilon) - \hat{T}(\Delta_n)}{\varepsilon}\right]^S\right]^U \quad (10)$$

where [•]A denotes the mapping onto set A, which may be used to reduce the effect of the random variation of the throughput on the online optimization algorithm. For example, S and U may be chosen as S=[−0.1,0.1] and U=[−2,2] to limit the absolute CQI offset increment within 0.1 and the absolute CQI offset 738 within 2. As in Equation (5), the mapping [•]A may be used to avoid undesired large CQI offset 738. Equation (10) differs from the Kiefer-Wolfowitz algorithm in that Equation (10) uses a fixed α and ε, while the Kiefer-Wolfowitz algorithm uses decreasing α and ε.

In fading channels, the throughput may change over time. To track the throughput variation, the α and ε may be adapted using an alpha estimator 790 and an epsilon estimator 792, respectively. For the description of the alpha estimator 790 and the epsilon estimator 792, let $\hat{T}'(\Delta_n) = \frac{\hat{T}(\Delta_n + \varepsilon) - \hat{T}(\Delta_n)}{\varepsilon}$, $F_n = \frac{\partial \Delta_n}{\partial \alpha}$, and $P_n = \frac{\partial \Delta_n}{\partial \varepsilon}$.

Ignoring the mapping in Equation (10), the partial derivative of both sides may be taken by the alpha estimator 790 with respect to α, which gives $F_0=0$ and Equation (11):

$$F_{n+1} = \left(1 + \frac{\alpha}{T_n}\hat{T}''(\Delta_n)F_n + \frac{1}{T_n}\hat{T}'(\Delta_n)\right) \quad (11)$$

Let $\alpha_n$ denote α in the n-th iteration. Then, the alpha estimator 790 may produce an updated $\alpha_n$ using another gradient method as in Equation (12):

$$\alpha_{n+1} = \left[\alpha_n + \mu_1 \frac{\partial T(\Delta_n)}{\partial \alpha}\right]^{V_1} \approx [\alpha_n + \mu_1 \hat{T}'(\Delta_n)]^{V_1} \quad (12)$$

where $$\frac{dT(\Delta_n)}{d\Delta}$$

is replaced by its short term average $\hat{T}(\Delta_n)$, $\mu_1 > 0$ is a stepsize and $V_1$ is a constraint set, e.g., V1=[0.0001,0.5]. Similarly, the epsilon estimator 792 may take the partial derivative of both sides of Equation (10) with respect to ε, gives $P_0=0$ and Equation (13):

$$P_{n+1} = P_n + \frac{\alpha}{T_n}(1 + P_n)\hat{T}''(\Delta_n) \quad (13)$$

Let $\varepsilon_n$ denote the ε in the n-th iteration. By using the gradient method, the epsilon estimator 792 may update $\varepsilon_n$ as in Equation (14):

$$\varepsilon_{n+1} = \left[\varepsilon_{n+\mu_2} \frac{\partial T(\Delta_n)}{\partial \alpha}\right]^{V_2} \approx [\varepsilon_n + \mu_2 \hat{T}'(\Delta_n)P_n]^{V_2} \quad (14)$$

where $\mu_2 > 0$ is a stepsize and $V_2$ is a constraint set, e.g., $V_2$=[−0.2,0.2]. In Equation (11) and Equation (13), the second order derivative $\hat{T}''(\Delta_n)$ is approximated by Equation (15):

$$\hat{T}''(\Delta_n) = \frac{\hat{T}'(\Delta_n) - \hat{T}'(\Delta_k)}{\Delta_n - \Delta_k} \quad (15)$$

where k<n is the first integer such that $|\Delta_n - \Delta_k| > \varepsilon_n$. Therefore, the online throughput optimization algorithm is the combination of Equations (10), (12) and (14). In other words, the estimated average throughput 786, ($\hat{T}$), the estimated average Nth iteration throughput 788, (T), an updated $\alpha_n$ from the alpha estimator 790, and an updated $\varepsilon_n$ from the epsilon estimator 792 may be combined by a CQI offset estimator 754 according to Equation (10) to produce a CQI offset 738. The CQI offset 738 may then be used to adjust the CQI 732 and produce an adjusted CQI 760. The adjusted CQI 760 may be used to tailor future transmissions and allocate various downlink resources, i.e., choose a transport block size (TBS), a modulation scheme, etc.

To implement the online algorithm, $\Delta_1=0$ and $\varepsilon_1$ may be chosen to be a small value to induce the gradient method, e.g., $\varepsilon_1=-0.1$. In the n-th iteration, $\hat{T}(\Delta_n)$ 786 may be evaluated using a window of size w and then switched to $(\Delta n+\varepsilon_n)$ to compute $\hat{T}(\Delta_n+\varepsilon_n)$ using another window. The parameters $\alpha_n$, $\varepsilon_n$, $\Delta_n$, $F_n$, and $P_n$, are then updated using Equation (10) through Equation (14), respectively. To prevent throughput degradation, the sign of $\varepsilon_n$ may be assigned in the direction of the gradient $\hat{T}'(\Delta_{n-1})$. Similar to the offline algorithm, the online algorithm may also be implemented at both a base station 304 and a wireless communication device 302.

A simple approximation of the gradient has been used. However, there are other alternatives, such as parabolic interpolation, which may improve the gradient estimation but at the expense of higher complexity. The online algorithm may also be readily extended to maximize the average throughput per orthogonal variable spreading factor (OVSF) code.

Figure 10:
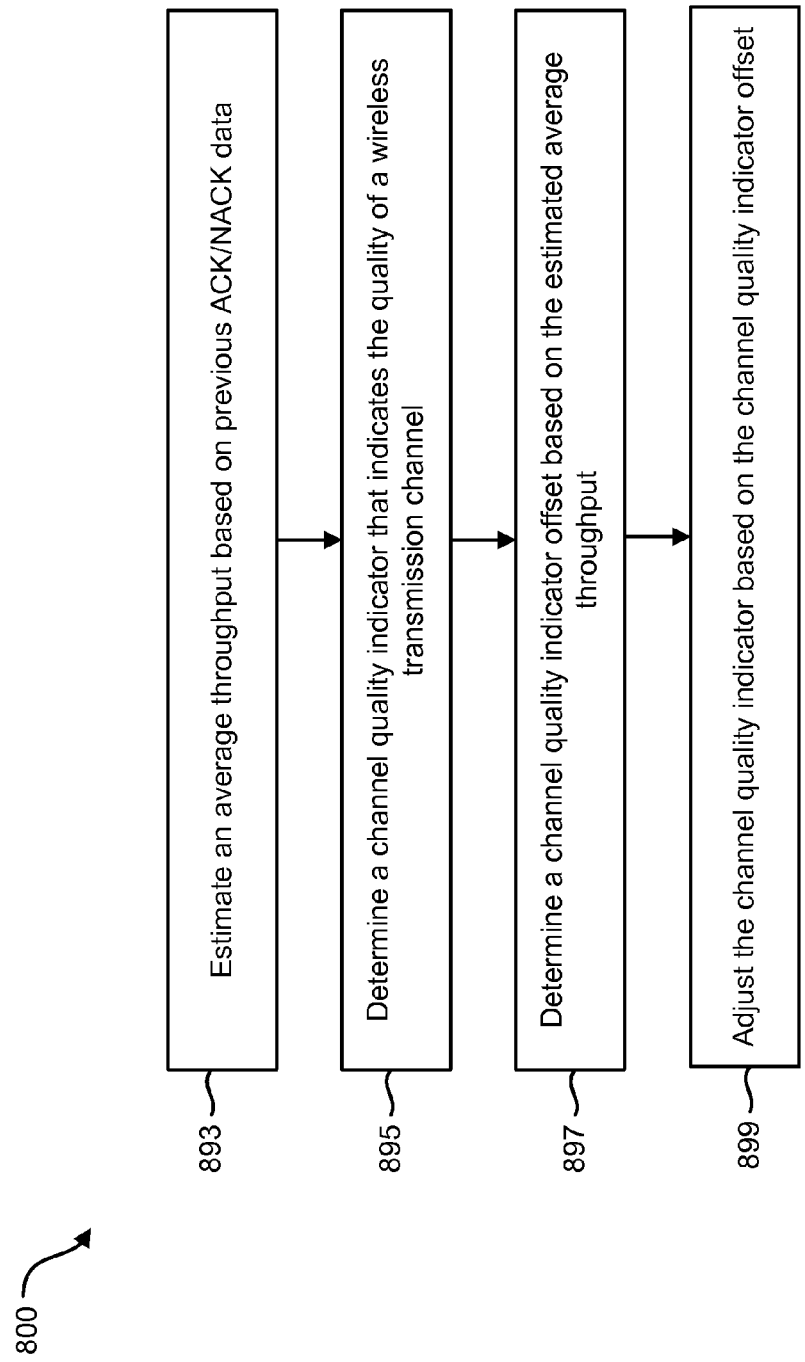
FIG. 10 is a flow diagram of a method for optimizing throughput in a wireless communication system.

FIG. 10 is a flow diagram of a method 800 for optimizing throughput in a wireless communication system 300. The method 800 may use online optimization techniques and may be performed by an online optimization module 748. The online optimization module 748 may estimate 893 an average throughput 786 based on previous ACK/NACK history 734. The online optimization module 748 may also determine 895 a CQI 732 that indicates the quality of a wireless transmission channel. The online optimization module 748 may also determine 897 a CQI offset 738 based on the estimated average throughput 786. The online optimization module 748 may also adjust 899 the CQI 732 based on the CQI offset 738. The adjusted CQI 760 may then be used to tailor future transmissions from a base station 304 to a wireless communication device 302.

Figure 11:
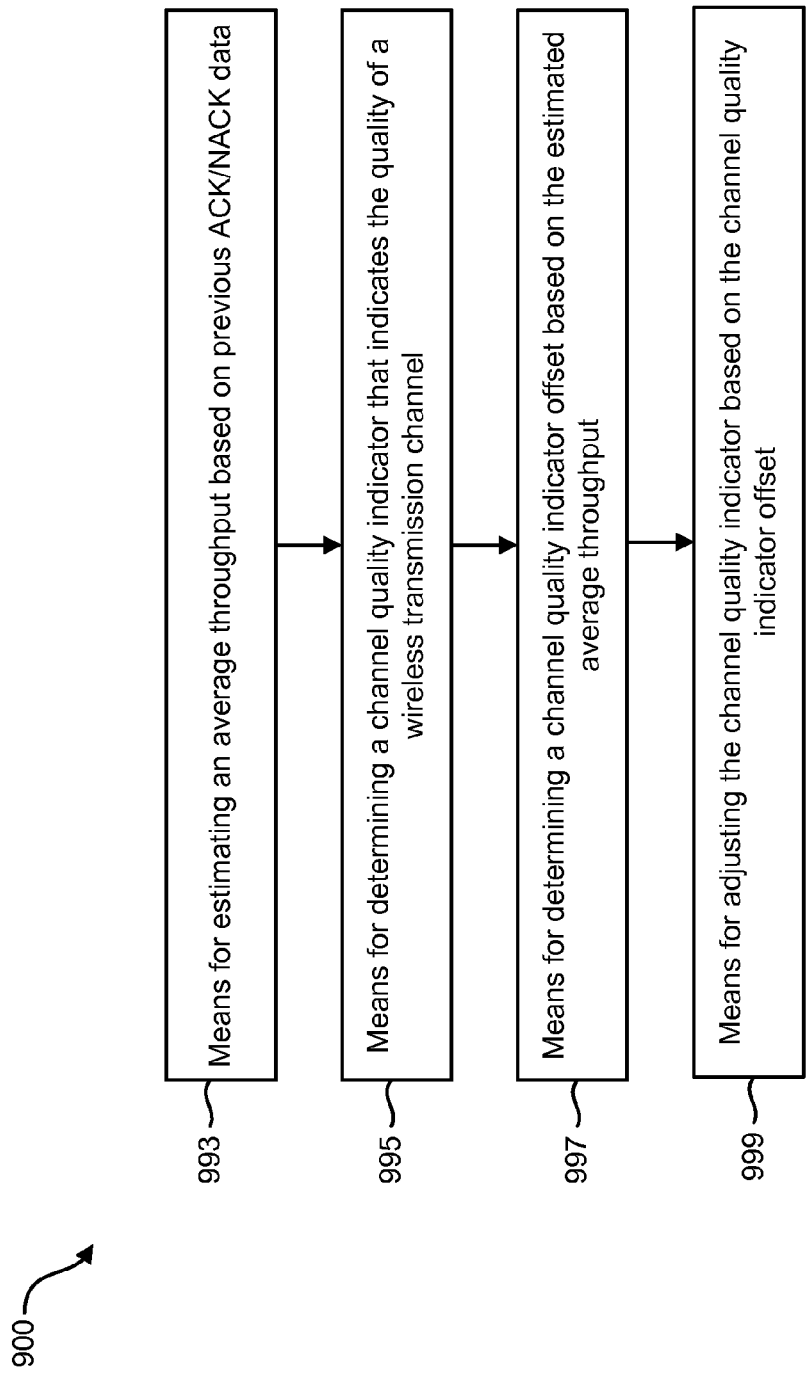
FIG. 11 illustrates means-plus-function blocks corresponding to the method of FIG. 10.

The method 800 of FIG. 10 described above may be performed by various hardware and/or software component(s) and/or module(s) corresponding to the means-plus-function blocks 900 illustrated in FIG. 11. In other words, blocks 893 through 899 illustrated in FIG. 10 correspond to means-plus-function blocks 993 through 999 illustrated in FIG. 11.

The performance of the throughput optimization algorithms may be evaluated using a simulator, e.g., a C++ HSDPA system simulator. A parameter, geometry G, may be used in the simulations, which is defined as $G=I_{or}I_{oc}+N$, where $I_{or}$ is the signal power from the base station 304 in the target cell, $I_{oc}$ represents the signal power received from adjacent cells, and N is the thermal noise power. The results below use an additive white Gaussian noise (AWGN) channel model, two pedestrians moving at 3 kmph (PA3, PB3), and a vehicle moving at 30 kmph and 120 kmph (VA30, VA120).

The offline algorithm depends on two parameters: window size w and stepsize α. For a fixed window size w, a larger α corresponds to a larger deviation of the CQI offset 338, a lower throughput, and a faster convergence. Therefore, there is a tradeoff between the achievable throughput and the convergence rate. Parameter values of w=20 and α=1 are used to generate the results below. Table I compares the block error rate achieved using the offline algorithm in different channels when the target block error rate 346 is set to 15%. The proposed offline algorithm achieves the target block error rate 346 with a high accuracy. In the online algorithm, the window size should be chosen to be small so as to track the channel variation when channel varies fast.

TABLE I

| Geometry (dB) | AWGN | PA3 | PB3 | VA30 | VA120 |
|---|---|---|---|---|---|
| 0 | 15.11% | 15.04% | 15.02% | 15.13% | 15.10% |
| 5 | 15.12% | 15.03% | 15.02% | 15.11% | 15.09% |
| 10 | 15.05% | 15.03% | 15.02% | 15.09% | 15.05% |
| 15 | 15.08% | 15.02% | 15.01% | 15.12% | 15.07% |

A target block error rate of 10% is not always throughput optimal. The throughput optimal block error rate 346 depends on the channel profile. Table II illustrates the gain in throughput at the optimal block error rate 346 relative to throughput at a 10% block error rate in different channels at a 10 dB geometry. In Table II, the throughput optimal block error rate 346 varies from 10% to 90% for different channel profiles. At 10 dB geometry, the throughput optimal block error rate 346 is 15% in AWGN and PA3, 20% in PB3, and 90% in VA30 and VA120. In some channels, the throughput at the optimal block error rate 346 is about 30% higher than the throughput at 10% block error rate. The 30% throughput gain is significant in practical systems and it is achieved with low complexity. The wireless communication system 300 should base its choice of target block error rate 346 on channel variations.

TABLE II

|  | AWGN | PA3 | PB3 | VA30 | VA120 |
|---|---|---|---|---|---|
| Optimal BLER | 15% | 15% | 20% | 90% | 90% |
| Throughput gain | 0.3% | 4.4% | 6.6% | 32.6% | 16.7% |

The preceding results are described for a wireless communication system 300 where retransmissions are sent at the same transmit power as first transmissions, i.e. there is no power back-off in retransmissions. The presence of a power back-off in retransmissions may influence the throughput optimal block error rate 346 in different path profiles, as explained below. Retransmissions at lesser power are sufficient to recover the data in semi-static channels. In dynamic channels, the channel state may change significantly in the time between CQI 332 measurement and the corresponding downlink transmission. For example, in vehicle A 30 km/h, the channel fading may change to an independent state in roughly 4 ms, i.e. 2 subframes. When the network receives a CQI 332 report and schedules data accordingly, the channel condition in which this data is received may be very different from that suggested by the CQI 332, and retransmissions may be necessary. Depending on the power level of retransmissions relative to the first transmission, relying more on retransmissions by operating at a higher first BLER may improve throughput.

Figure 12:
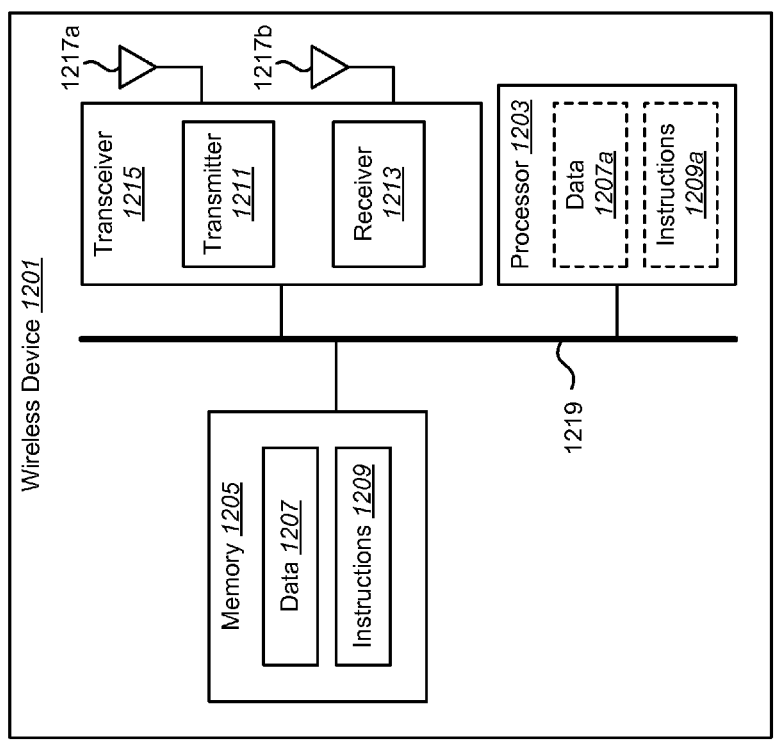
FIG. 12 illustrates certain components that may be included within a wireless device.

FIG. 12 illustrates certain components that may be included within a wireless device 1201. The wireless device 1201 may be a wireless communication device 302 or a base station 304, e.g., a Node B.

The wireless device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless device 1201 of FIG. 12, in an alternative configuration, a combination of processors (e.g., an ARM and DSP) could be used.

The wireless device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1207, various portions of the instructions 1209a may be loaded onto the processor 1203, and various pieces of data 1207a may be loaded onto the processor 1203.

The wireless device 1201 may also include a transmitter 1211 and a receiver 1213 to allow transmission and reception of signals between the wireless device 1201 and a remote location. The transmitter 1211 and receiver 1213 may be collectively referred to as a transceiver 1215. An antenna 1217 may be electrically coupled to the transceiver 1215. The wireless device 1201 may also include (not shown) multiple transmitters, multiple receivers, multiple transceivers and/or multiple antenna.

The various components of the wireless device 1201 may be coupled together by one or more buses, which may include a power bus, a control signal bus, a status signal bus, a data bus, etc. For the sake of clarity, the various buses are illustrated in FIG. 12 as a bus system 1219.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 7, and 10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for optimizing throughput in a wireless communication system, comprising:
    estimating a short term block error rate intended to estimate a long term block error rate and based on a window for a time interval of a history of previous acknowledgment data;
    determining a channel quality indicator offset based on the short term block error rate and a target block error rate using a gradient descent method; and
    adjusting, by an apparatus, a channel quality indicator based on the channel quality indicator offset, wherein the channel quality indicator indicates a quality of a wireless transmission channel.

2. The method of claim 1, further comprising scheduling future transmissions in the wireless communication system based on the adjusted channel quality indicator.

3. The method of claim 1, wherein the wireless communication system uses High Speed Downlink Packet Access (HSDPA).

4. The method of claim 1, wherein the previous acknowledgment data indicates previous acknowledgment and non-acknowledgment signaling between a wireless communication device and a base station in the wireless communication system.

5. The method of claim 1, wherein the target block error rate indicates a block error rate associated with an optimal throughput for the wireless communication system.

6. The method of claim 1, wherein the adjusted channel quality indicator is designed to achieve the target block error rate in the wireless communication system.

7. The method of claim 1, further comprising estimating a target metric comprising an average throughput.

8. The method of claim 7, wherein the estimating the average throughput is further based on transmit block sizes over a predefined number of received subframes.

9. The method of claim 1, wherein the determining is further based on one or more previous channel quality indicator offsets.

10. An apparatus for optimizing throughput in a wireless communication system, comprising:
a processor;
memory in electronic communication with the processor;
instructions stored in the memory, the instructions being executable by the processor to:
estimate a short term block error rate intended to estimate a long term block error rate and based on a window for a time interval of a history of previous acknowledgment data;
determine a channel quality indicator offset based on the short term block error rate and a target block error rate using a gradient descent method; and
adjust a channel quality indicator based on the channel quality indicator offset, wherein the channel quality indicator indicates a quality of a wireless transmission channel.

11. The apparatus of claim 10, wherein the instructions are further executable to schedule future transmissions in the wireless communication system based on the adjusted channel quality indicator.

12. The apparatus of claim 10, wherein the wireless communication system uses High Speed Downlink Packet Access (HSDPA).

13. The apparatus of claim 10, wherein the previous acknowledgment data indicates previous acknowledgment and non-acknowledgment signaling between a wireless communication device and a base station in the wireless communication system.

14. The apparatus of claim 10, wherein the target block error rate indicates a block error rate associated with an optimal throughput for the wireless communication system.

15. The apparatus of claim 10, wherein the adjusted channel quality indicator is designed to achieve the target block error rate in the wireless communication system.

16. The apparatus of claim 10, wherein the instructions executable to estimate are further executable to estimate a target metric comprising an average throughput for a wireless communication device.

17. The apparatus of claim 16, wherein the instructions executable to estimate are further executable to estimate the average throughput based on transmit block sizes over a predefined number of received subframes.

18. The apparatus of claim 10, wherein the instructions executable to determine are further executable to determine the channel quality indicator offset based on one or more previous channel quality indicator offsets.

19. An apparatus for optimizing throughput in a wireless communication system, comprising:
means for estimating a short term block error rate intended to estimate a long term block error rate and based on a window for a time interval of a history of previous acknowledgment data;
means for determining a channel quality indicator offset based on the short term block error rate and a target block error rate using a gradient descent method; and
means for adjusting a channel quality indicator based on the channel quality indicator offset, wherein the channel quality indicator indicates a quality of a wireless transmission channel.

20. The apparatus of claim 19, wherein the previous acknowledgment data indicates previous acknowledgment and non-acknowledgment signaling between a wireless communication device and a base station in the wireless communication system.

21. The apparatus of claim 19, further comprising means for estimating a target metric comprising an average throughput for a wireless communication device over a predefined number of received subframes.

22. The apparatus of claim 21, the average throughput based on previous acknowledgment data and transmit block sizes over a predefined number of received subframes.

23. The apparatus of claim 19, further comprising means for determining a channel quality indicator offset based on a target metric and one or more previous channel quality indicator offsets.

24. A computer-program product for optimizing throughput in a wireless communication system, the computer-program product comprising a non-transitory computer-readable medium having instructions thereon, the instructions comprising:
code for estimating a short term block error rate intended to estimate a long term block error rate and based on a window for a time interval of a history of previous acknowledgment data;
code for determining a channel quality indicator offset based on the short term block error rate and a target block error rate using a gradient descent method; and
code for adjusting a channel quality indicator based on the channel quality indicator offset, wherein the channel quality indicator indicates a quality of a wireless transmission channel.

25. The computer-program product of claim 24, wherein the previous acknowledgment data indicates previous acknowledgment and non-acknowledgment signaling between a wireless communication device and a base station in the wireless communication system.

26. The computer-program product of claim 24, the instructions further comprising code for estimating a target metric comprising an average throughput for a wireless communication device over a predefined number of received subframes.

27. The computer-program product of claim 26, the average throughput based on previous acknowledgment data and transmit block sizes over a predefined number of received subframes.

28. The computer-program product of claim 24, further comprising code for determining a channel quality indicator offset based on a target metric and one or more previous channel quality indicator offsets.

* * * * *